United States Patent
Shimoyama et al.

(10) Patent No.: US 10,497,978 B2
(45) Date of Patent: Dec. 3, 2019

(54) POWER STORAGE DEVICE

(71) Applicant: NEC Corporation, Tokyo (JP)

(72) Inventors: Terumasa Shimoyama, Tokyo (JP); Takanori Nishi, Tokyo (JP); Shigeyuki Iwasa, Tokyo (JP); Katsumi Maeda, Tokyo (JP)

(73) Assignee: NEC Corporation, Tokyo (JP)

(*) Notice: Subject to any disclaimer, the term of this patent is extended or adjusted under 35 U.S.C. 154(b) by 138 days.

(21) Appl. No.: 15/558,689

(22) PCT Filed: Feb. 23, 2016

(86) PCT No.: PCT/JP2016/055215
§ 371 (c)(1),
(2) Date: Sep. 15, 2017

(87) PCT Pub. No.: WO2016/147811
PCT Pub. Date: Sep. 22, 2016

(65) Prior Publication Data
US 2018/0115018 A1 Apr. 26, 2018

(30) Foreign Application Priority Data
Mar. 16, 2015 (JP) ................. 2015-052186

(51) Int. Cl.
*H01M 10/0568* (2010.01)
*H01M 10/0525* (2010.01)
(Continued)

(52) U.S. Cl.
CPC ....... *H01M 10/0568* (2013.01); *H01M 4/608* (2013.01); *H01M 10/0525* (2013.01);
(Continued)

(58) Field of Classification Search
CPC ......... H01M 10/0568; H01M 10/0525; H01M 10/0569; H01M 10/0567; H01M 4/608;
(Continued)

(56) References Cited

U.S. PATENT DOCUMENTS

| | | | | |
|---|---|---|---|---|
| 2010/0190064 A1* | 7/2010 | Ikeda | | H01M 10/0525 429/330 |
| 2011/0129730 A1* | 6/2011 | Kasai | | H01M 4/136 429/213 |
| 2012/0100437 A1* | 4/2012 | Nakahara | | H01G 11/02 429/338 |

FOREIGN PATENT DOCUMENTS

| | | |
|---|---|---|
| JP | 2002-304996 A | 10/2002 |
| JP | 3878206 B2 | 2/2007 |

(Continued)

OTHER PUBLICATIONS

Han et al., "Lithium bis(fluorosulfonyl)imide (LiFSI) as conducting salt for nonaqueous liquid electrolytes for lithium-ion batteries: Physicochemical and electrochemical properties," 2011, Journal of Power Sources, 196, 3623-3632. (Year: 2011).*

(Continued)

*Primary Examiner* — Ula C Ruddock
*Assistant Examiner* — Matthew W Van Oudenaren
(74) *Attorney, Agent, or Firm* — Wilmer Cutler Pickering Hale and Dorr LLP

(57) ABSTRACT

A secondary battery exhibiting high charge and discharge rate characteristics can be provided, by making the secondary battery have a cathode including a nitroxyl compound taking a nitroxyl cation substructure represented by the following formula (1) in an oxidized state and a nitroxyl radical substructure represented by the following formula (2) in a reduced state, an anode including an active material capable of reversibly intercalating and deintercalating a (Continued)

lithium ion, and an electrolyte solution including a lithium salt and an aprotic organic solvent, and employing Li[(FSO$_2$)$_2$N] as the lithium salt:

Reaction Scheme (A)

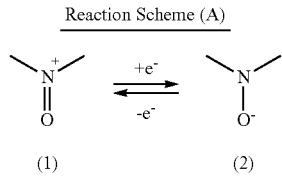

(1)            (2)

22 Claims, 1 Drawing Sheet

(51) Int. Cl.
    *H01M 10/0567*     (2010.01)
    *H01M 10/0569*     (2010.01)
    *H01M 4/587*     (2010.01)
    *H01M 4/60*     (2006.01)

(52) U.S. Cl.
    CPC ........ *H01M 10/0569* (2013.01); *H01M 4/587* (2013.01); *H01M 10/0567* (2013.01); *H01M 2220/30* (2013.01); *H01M 2300/0025* (2013.01); *Y02T 10/7011* (2013.01)

(58) Field of Classification Search
    CPC ............. H01M 4/587; H01M 2220/30; H01M 2300/0025
    See application file for complete search history.

(56) References Cited

FOREIGN PATENT DOCUMENTS

| | | |
|---|---|---|
| JP | 2009-295397 A | 12/2009 |
| JP | 2013-251068 A | 12/2013 |
| JP | 2014-127370 A | 7/2014 |
| JP | 2014-241198 A | 12/2014 |
| WO | WO-2014/092016 A1 | 6/2014 |
| WO | WO-2014/115737 A1 | 7/2014 |

OTHER PUBLICATIONS

Nakahara et al., "Cell properties for modified PTMA cathodes of organic radical batteries," 2007, Journal of Power Sources, 165, 398-402. (Year: 2007).*

International Search Report corresponding to PCT/JP2016/055215, dated May 31, 2016 (5 total pages).

* cited by examiner

[Fig. 1]
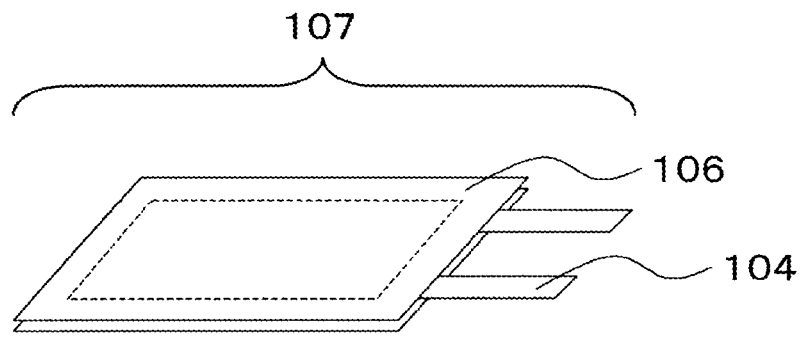
[Fig. 2]
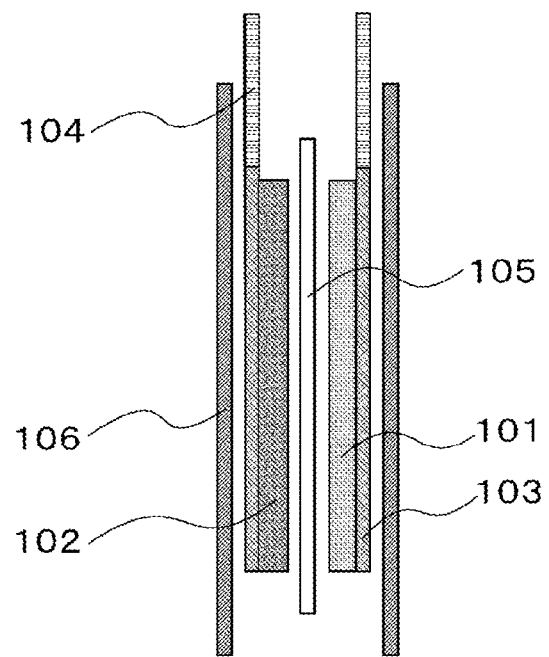

POWER STORAGE DEVICE

CROSS REFERENCE TO RELATED APPLICATIONS

This application is a national stage application of International Application No. PCT/JP2016/055215 entitled "POWER STORAGE DEVICE", filed on Feb. 23, 2016, which claims the benefit of the priority of Japanese Patent Application No. 2015-052186, filed on Mar. 16, 2015, the disclosures of each of which are hereby incorporated by reference in their entirety.

TECHNICAL FIELD

The present invention relates to a power storage device comprising a cathode containing a nitroxyl radical compound, an anode containing a material capable of reversibly intercalating and deintercalating a lithium ion, and an electrolyte solution containing an aprotic organic solvent containing a lithium salt dissolved therein.

BACKGROUND ART

In recent years, portable electronic devices such as notebook personal computers and cellular phones have been variously functionalized as communication functions, movie reproduction functions, camera functions and the like. For power storage devices to be used for these portable electronic devices, there are demanded a high energy density, a high output characteristic, a high rate characteristic, a high safety and a high cycle stability.

As a power storage device having a high output characteristic and a high rate characteristic, there is proposed a power storage device (hereinafter, referred to as "organic radical battery") containing a nitroxyl compound in its cathode (for example, Patent Literature 1). The nitroxyl compound takes an oxoammonium cation substructure in an oxidized state and takes a nitroxyl radical substructure in a reduced state, and carries out electron transfer between the two states; and this reaction is used as an electrode reaction of the cathode. Since the electrode reaction progresses relatively rapidly, the power storage device is allowed to be discharged and charged at large currents. That is, there can be obtained a secondary battery having a high output, and the "organic radical battery" posing no problem of thermal runaway is a secondary battery having high safety. In recent years, however, needs for quick charging have risen and a further high rate characteristic has been demanded.

Patent Literature 2 discloses an ionic conductive material containing an ionic compound represented by the formula: Li$^+$[(FSO$_2$)$_2$N]$^-$ in a solution of an aprotic solvent. It is disclosed that the [(FSO$_2$)$_2$N]$^-$ anion (hereinafter, FSI anion) has wide stabilities against the redox phenomenon and has a high conductivity. Further Patent Literature 3 discloses a lithium secondary battery characterized in using an electrolyte solution containing FSI anions in the lithium secondary battery in which a lithium transition metal composite oxide is employed as its cathode. In this battery, it is conceivable that by using a specific electrolyte solution containing FSI anions, a film is formed on the electrode and a rise in the internal resistance is suppressed to thereby realize a high rate characteristic. Further Patent Literature 4 reports that by using, as an electrolyte solution for a lithium secondary battery, an electrolyte solution containing acetonitrile being a low-viscosity solvent and Li$^+$[(FSO$_2$)$_2$N]$^-$ of 3.0 mol/L or higher, an excellent rate characteristic is attained.

CITATION LIST

Patent Literature

Patent Literature 1: JP2002-304996A
Patent Literature 2: JP3878206B
Patent Literature 3: JP2014-127370A
Patent Literature 4: JP2014-241198A

SUMMARY OF INVENTION

Technical Problem

Although as described above, there are known applications of the FSI anion to lithium secondary batteries using a lithium transition metal oxide for their cathode, in such systems, the anion, since participating in the formation of the film and the conductivity in the electrolyte solution, exerts an effect on the resistance value only, and exerts no effect on the electrode reaction of the cathode and the carrier diffusion in the cathode. In the case of an "organic radical battery", however, although it is conceivable that since an anion participates in the electrode reaction of a nitroxyl compound being a cathode active material, the kind of the anion affects the electrode reaction and the carrier diffusion rate in the cathode, and the battery performance such as the charge and discharge rate characteristics is largely affected, although knowledge thereon is insufficient.

The present invention has been achieved in consideration of these problems, and is to provide an "organic radical battery"-type power storage device having higher charge and discharge rate characteristics than conventional "organic radical batteries".

Solution to Problem

According to one aspect of the present invention, there is provided a power storage device including: a cathode including a nitroxyl compound taking a nitroxyl cation substructure represented by the following formula (1) in an oxidized state and a nitroxyl radical substructure represented by the following formula (2) in a reduced state; an anode including an active material capable of reversibly intercalating and deintercalating a lithium ion; and an electrolyte solution including a lithium salt and an aprotic organic solvent, wherein the lithium salt includes Li[(FSO$_2$)$_2$N].

Reaction Scheme (A)

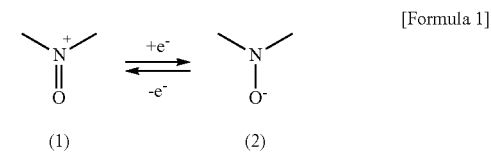

[Formula 1]

Advantageous Effects of Invention

According to the example embodiment, there can be provided an "organic radical battery"-type power storage device improved in the charge and discharge rate characteristics. The power storage device according to the present invention additionally holds an advantage of being a power storage device having intrinsic characteristics of the "organic radical battery", that is, posing no problem of thermal runaway and having a high safety and a high power.

BRIEF DESCRIPTION OF DRAWINGS

FIG. 1 It is a perspective view of a laminated power storage device according to an example embodiment of the present invention.

FIG. 2 It is a cross-sectional view to interpret a constitution of a laminated power storage device according to an example embodiment of the present invention.

DESCRIPTION OF EMBODIMENT

Then, example embodiments will be described by reference to the drawings.

[1] Materials to be Used for Fabricating a Cathode or an Anode

First, materials to be used for fabricating a cathode or an anode will be described.

[1-1] Cathode Active Material

As a cathode active material in a power storage device according to the example embodiment, there is used a nitroxyl compound taking a nitroxyl cation substructure (N-oxoammonium cation substructure) represented by the formula (1) in the oxidized state and a nitroxyl radical substructure represented by the formula (2) in the reduced state. The nitroxyl compound can carry out a redox reaction represented by the Reaction Scheme (A) in which electron transfer is carried out between these two states. The power storage device according to the present example embodiment uses this redox reaction as the electrode reaction of its cathode.

Reaction Scheme (A)

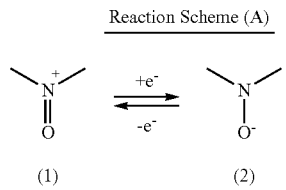

[Formula 2]

(1)      (2)

The structure of the nitroxyl compound is, but not especially limited, is preferably a nitroxyl polymer compound from the viewpoint of the low solubility to an electrolyte solution.

The nitroxyl polymer compound is preferably a polymer containing, as its side chain, a cyclic nitroxyl structure represented by the following formula (Ia) in the oxidized state.

[Formula 3]

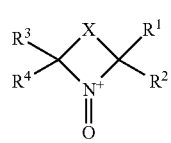

(Ia)

wherein $R^1$ to $R^4$ each independently represent an alkyl group having 1 to 4 carbon atoms; X represents a divalent group forming a 5- to 7-membered ring, provided that with X constituting a part of the side chain of the polymer, the cyclic nitroxyl structure represented by the formula (Ia) makes a part of the polymer.

$R^1$ to $R^4$ each independently represent an alkyl group having 1 to 4 carbon atoms, and is preferably an ethyl group or a methyl group, and especially preferably a methyl group in the point of the stability of the radical.

X specifically includes —$CH_2CH_2$—, —$CH_2CH_2CH_2$—, —$CH_2CH_2CH_2CH_2$—, —CH=CH—, —CH=CHCH$_2$—, —CH=CHCH$_2$CH$_2$— and —CH$_2$CH=CHCH$_2$—; and among these, non-adjacent —CH$_2$-moieties may be replaced with —O—, —NH— or —S—, and —CH= may be replaced with —N=. Further, hydrogen atoms bonded to atoms constituting the ring may be substituted with an alkyl group, a halogen atom, =O, an ether group, an ester group, a cyano group, an amido group or the like.

An especially preferable cyclic nitroxyl structure is selected from a 2,2,6,6-tetramethylpiperidinyloxy radical (or cation), a 2,2,5,5-tetramethylpyrrolidinyloxy radical (or cation), and a 2,2,5,5-tetramethyl-3-pyrrolinyloxy radical (or cation).

The cyclic nitroxyl structure represented by the formula (Ia), as shown in the formula (Ib), can bond to a polymer through a residue formed by eliminating hydrogen from —CH$_2$—, —CH= or —NH— constituting a ring member in X.

[Formula 4]

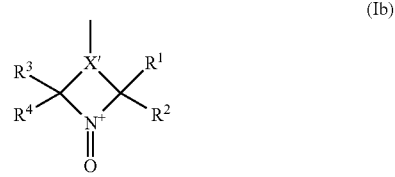

(Ib)

Here, $R^1$ to $R^4$ in the formula (Ib) correspond to $R^1$ to $R^4$ in the formula (Ia), respectively, and X' in the formula (Ib) means a residue X' formed by eliminating hydrogen from —CH$_2$—, —CH= or —NH— constituting a ring member in X in the formula (Ia).

A polymer to be used as the main chain of the nitroxyl polymer compound is not especially limited, and suffices if a cyclic nitroxyl structure represented by the formula (Ia) can be present as side chains thereof.

The nitroxyl polymer compound includes one in which the groups of the formula (Ib) are added to a usual polymer or one in which a part of atoms or groups of a polymer is substituted with the groups of the formula (Ib). An atom constituting the cyclic structure of the formula (Ib) may bond to a polymer (main chain) not directly but through a suitable divalent group therebetween. For example, X' and an atom of the main chain of the polymer can bond through a divalent group such as an ester bond (—COO—) or an ether bond (—O—).

As a polymer to be used as the main chain of the nitroxyl polymer compound, in the point of being excellent in electrochemical durability, preferable are polyalkylene-based polymers such as polyethylene and polypropylene; poly(meth)acrylic acid; poly(meth)acrylamide-based polymers such as poly(meth)acrylamide, polymethyl(meth)acrylamide and polydimethyl(meth)acrylamide; poly(meth)acrylate-based polymers such as polymethyl (meth)acrylate and polyethyl (meth)acrylate; and polystyrene-based polymers such as polystyrene, polybromostyrene, polychlorostyrene and polymethylstyrene.

Among these nitroxyl polymer compounds, preferable is a polymer compound represented by one of the following formulas (3) to (7) and having a polymethacrylate or a polyacrylate as its main chain, which are high particularly in stability.

[Formula 5]

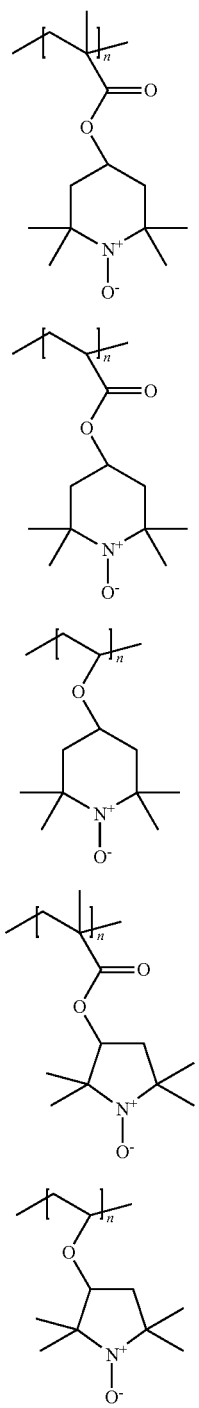

wherein n is an integer of 1 or more.

Nitroxyl polymer compounds represented by the formulas (3) to (5) are ones having 2,2,6,6-tetramethylpiperidinyloxy radicals (or cations) as their side chains; and nitroxyl polymer compounds represented by the formulas (6) and (7) are ones having 2,2,5,5-tetramethylpyrrolidinyloxy radicals (or cations) as their side chains. These nitroxyl polymer compounds are compounds having sterically-hindered stable radicals as the polymer side chains.

The weight-average molecular weight of the nitroxyl polymer compound, from the viewpoint of the solubility to an electrolyte solution, is selected to be 1,000 or higher, preferably 10,000 or higher, and especially preferably 20,000 or higher. A higher molecular weight is better, but at the highest, the molecular weight is selected to be 5,000,000 or lower, and preferably 500,000 or lower.

The skeleton structure of the nitroxyl polymer compound can be of any of a chain form, a branched form and a network form, or can be a structure crosslinked with a crosslinking agent.

Further, the nitroxyl polymer compound can be used singly, but may be used as a mixture of two or more thereof.

[1-2] Negative Electrode Active Material

As an anode active material in the power storage device according to the present example embodiment, there can be used a material capable of reversibly storing and releasing a lithium ion (material capable of intercalating a lithium ion in the charge time and deintercalating a lithium ion in the discharge time). As such an anode active material, there can be used metal oxides, carbon materials such as graphite, and the like. The shape of these materials is not especially limited, and includes thin film forms, hardened powder forms, fibrous forms, and flake forms, for example. Further, these negative electrode active materials can be used singly or in combinations.

[1-3] Conductive Additive

In active material layers in the power storage device according to the present example embodiment, a conductive additive can be added. The conductive additive includes carbonaceous microparticles such as graphite, carbon black and acetylene black, carbon fibers such as vapor grown carbon fibers and carbon nanotubes, and conductive polymers such as polyaniline, polypyrrole, polythiophene, polyacetylene and polyacene.

From the point of fully providing the addition effect of the nitroxyl polymer compound, the content of the nitroxyl polymer compound in the cathode active material is preferably 50% by mass or higher, and more preferably 70% by mass or higher.

[1-4] Binder

The cathode and the anode in the power storage device according to the present example embodiment can include binders to form the respective active material layers. Examples of the binders include resin binders such as polytetrafluoroethylene (PTFE), polyvinylidene fluoride, vinylidene fluoride-hexafluoropropylene copolymers, vinylidene fluoride-tetrafluoroethylene copolymers, styrene-butadiene copolymer rubber, polypropylene, polyethylene, polyimide, partially carboxylated cellulose and various types of polyurethane.

[1-5] Current Collector

The cathode and the anode in the power storage device according to the present example embodiment are constituted by forming respective active material layers on respective current collectors. As the current collectors, there can be used foils, sheets, flat plates and the like composed of nickel, aluminum, copper, an aluminum alloy, stainless steel, carbon or the like.

[2] Basic Structure of the Power Storage Device, Constituting Members, and Production Method of the Power Storage Device A production method of the power storage device (hereinafter, referred to as secondary battery) according to the present example embodiment is not especially limited, and there can be used a method suitably selected according to materials.

The production method is, for example, a method in which a solvent is added to the active material, the conductive additive, the binder and the like to make a slurry; the slurry is applied on the current collector; the solvent is vaporized by heating or at normal temperature to thereby fabricate the electrode; further, the electrode and the counter electrode with a separator interposed therebetween are stacked or wound and the resultant is encased with an outer package; an electrolyte solution is introduced therein; and the outer package is sealed. The solvent for making the slurry includes ether-based solvents such as tetrahydrofuran, diethyl ether, ethylene glycol dimethyl ether and dioxane; amine-based solvents such as N,N-dimethylformamide and N-methylpyrrolidone; aromatic hydrocarbon-based solvents such as benzene, toluene and xylene; aliphatic hydrocarbon-based solvents such as hexane and heptane; halogenated hydrocarbon-based solvents such as chloroform, dichloromethane, dichloroethane, trichloroethane and carbon tetrachloride; alkyl ketone-based solvents such as acetone and methyl ethyl ketone; alcoholic solvents such as methanol, ethanol and isopropyl alcohol; and dimethyl sulfoxide and water, etc.

Further, a fabrication method of the electrode also includes a method in which after the active material, the conductive additive, the binder and the like are kneaded in a dry system, the mixture is made into a thin film, and laminated on the current collector.

In a fabrication method of the cathode, in the case where: the solvent is added to the cathode active material, particularly the organic cathode active material, the conductive additive and the like to make a slurry; the slurry is applied on the cathode current collector; and the solvent is vaporized by heating or at normal temperature, exfoliation, cracking and the like of the electrode are liable to occur. In the present example embodiment, the case where the polymeric nitroxyl radical compound is used and the cathode of preferably 40 µm or larger and 300 µm or smaller in thickness is fabricated has such a feature that there can be fabricated a uniform cathode in which exfoliation, cracking and the like thereof hardly occur.

In the present example embodiment, other production conditions including drawing-out of a lead from the electrode and outer-packaging can use conventionally well-known methods as production methods of secondary batteries.

FIG. 1 illustrates a perspective view of one example of a laminate-type power storage device (secondary battery) according to the present example embodiment; and FIG. 2 illustrates a cross-sectional view thereof. As illustrated in these figures, a secondary battery 107 has a stacked structure including a cathode 101, an anode 102 facing the cathode, and a separator 105 interposed between the cathode and the anode; the stacked structure is covered with exterior packaging films 106; and electrode leads 104 are led out outside the exterior packaging films 106. An electrolyte solution is introduced in the secondary battery. Hereinafter, constituting members and the production method of the secondary battery will be described in more detail.

In the present example embodiment, the shape of the secondary battery is not especially limited, and a conventionally well-known one can be used. The secondary battery shape includes a shape in which an electrode stack or an electrode winding is sealed with a metal case, a resin case, a laminate film composed of a metal foil such as an aluminum foil and a synthetic resin film, or the like, and is fabricated as a cylindrical shape, a rectangular shape, a coin shape, a sheet shape and the like, but the present invention is not limited thereto.

[2-1] Cathode

The cathode 101 includes the cathode active material, and further includes the conductive additive and the binder according to needs, and is formed on one of the current collectors 103.

[2-2] Anode

The anode 102 includes the anode active material, and further includes the conductive additive and the binder according to needs, and is formed on the other one of the current collectors 103.

[2-3] Separator

Between the cathode 101 and the anode 102, there is installed the insulating porous separator 105 to dielectrically separate these. As the separator 105, there can be used a porous resin film composed of a polyethylene, a polypropylene or the like, a cellulose membrane, a nonwoven fabric or the like.

[2-4] Electrolyte Solution

The electrolyte solution transports charged carriers between the cathode and the anode, and is impregnated in the cathode 101, the anode 102 and the separator 105. As the electrolyte solution, there can be used a nonaqueous electrolyte solution containing a lithium salt dissolved in an organic solvent. As the solvent of the electrolyte solution, an aprotic organic solvent can be used. Film forming additives can be used according to needs.

The lithium salt includes Li[(FSO$_2$)$_2$N] (hereinafter, LiFSI). LiFSI can be used singly, or can be further used as a mixture with other lithium salts. As lithium salts usable other than LiFSI, there can be used, for example, usual electrolyte materials such as LiPF$_6$, LiClO$_4$, LiBF$_4$, LiCF$_3$SO$_3$, LiN(CF$_3$SO$_2$)$_2$ (hereinafter, "LiTFSI"), LiN (C$_2$F$_5$SO$_2$)$_2$ (hereinafter, "LiBETI"), Li(CF$_3$SO$_2$)$_3$C and Li(C$_2$F$_5$SO$_2$)$_3$C. In the lithium salts, LiFSI is used in 50% by mass or more, preferably in 80% by mass or more, and more preferably in 90% by mass or more, and particularly, it is best that LiFSI is used singly (in 100% by mass). The concentration of the lithium salts is, from the viewpoint of the solubility and the ionic conductance, preferably 0.5 mol/L to 8 mol/L, and more preferably 1.5 mol/L to 6 mol/L. Further, the molar concentration of the lithium salts is, with respect to the number of moles of the nitroxyl cation substructure and the nitroxyl radical substructure contained in the secondary battery, preferably 1 or more times, and from the viewpoint of prevention of a shortage of the lithium salts, more preferably 1.5 or more times, and still more preferably 2 or more times.

Examples of the organic solvent include cyclic carbonates such as ethylene carbonate, propylene carbonate and butylene carbonate; linear carbonates such as dimethyl carbonate, diethyl carbonate and methyl ethyl carbonate; γ-lactones such as γ-butyrolactone; cyclic ethers such as tetrahydrofuran and dioxolane; and amides such as dimethylformamide, dimethylacetamide and N-methyl-2-pyrrolidone. The organic solvent can be used singly or as a mixture of two or more thereof. There can be used, for example, an organic solvent prepared by mixing at least one of cyclic carbonates and linear carbonates.

Examples of the film forming additives include cyclic monosulfonic acid esters such as 1,3-propanesultone and 1,4-butanesultone; cyclic carbonates such as vinylene carbonate; and linear disulfonate compounds. The film forming additives can be used singly or as a mixture of two or more thereof. The amount of the additives to be contained is preferably about 0.01% by weight to 10% by weight, and more preferably about 0.1% by weight to 2% by weight.

[2-5] Exterior Packaging Film

As the exterior packaging film, an aluminum laminate film or the like can be used. Exterior packages other than the exterior packaging film include metal cases and resin cases. The external shape of the power storage device includes cylindrical shapes, rectangular shapes, coin shapes and sheet shapes.

[2-6] Example of Fabrication of a Secondary Battery

The cathode 101 is put on the exterior packaging film 106, and the anode 102 is stacked thereon through the separator 105 to thereby prepare an electrode stack. The obtained electrode stack is covered with the exterior packaging films 106, and three sides containing electrode lead portions are heat-sealed. The electrolyte solution is introduced therein and is made to be impregnated under vacuum. After the electrolyte solution is made to be sufficiently impregnated to fill voids in the electrodes and the separator 105 with the electrolyte solution, the remaining fourth side is heat-sealed under reduced pressure to thereby fabricate the laminate-type secondary battery 107.

EXAMPLES

Hereinafter, the present invention will be described more specifically by way of Examples, but the present invention is not limited to these Examples.

(Fabrication of a Cathode)

A poly[(2,2,6,6-tetramethylpiperidinyloxy-4-yl) methacrylate] (PTMA) being a nitroxyl polymer used in the present Example was synthesized according to the method described in JP2009-238612A. The weight-average molecular weight of the obtained nitroxyl polymer was 40,000. The weight-average molecular weight was acquired as a value in terms of standard polystyrene by GPC.

2.1 g of the PTMA as a cathode active material, 0.63 g of a carbon material as a conductive additive, 0.24 g of a carboxymethyl cellulose (CMC) and 0.03 g of a polytetrafluoroethylene (PTFE) as binders, and 15 ml of water were stirred in a homogenizer to thereby prepare a homogeneous slurry. The slurry was applied on an aluminum foil as a cathode current collector, and dried at 80° C. for 5 min. The resultant was regulated in its thickness by a roll press machine, and used as a cathode. The obtained cathode, in the case of being used as a member of a secondary battery, was cut out into a rectangle of 22×24 mm; and an aluminum electrode lead 104 was pressure-bonded thereto by an ultrasonic wave, and the resultant was used. As a result of the regulation of the thickness by the roll press machine, the thickness of the cathode was in the range of 140 μm to 150 μm.

(Fabrication of an Anode)

13.5 g of a graphite powder (average particle diameter: 6 μm), 1.35 g of a polyvinylidene fluoride, 0.15 g of a carbon black and 30 g of N-methyl pyrrolidone were mixed, and stirred in a homogenizer to thereby prepare a homogeneous slurry.

The slurry was applied on a copper mesh (thickness: 30 μm) as an anode current collector, and then dried at 120° C. for 5 min. Further, the resultant was regulated in its thickness by a roll press machine, and cut out into a rectangle of 23×25 mm; and a nickel electrode lead was pressure-bonded thereto by an ultrasonic wave. The thickness of the obtained negative electrode (active substance layer) was 50 to 60 μm.

Example 1

A polypropylene porous film separator was interposed between the cathode and the anode to thereby obtain an electrode stack. The electrode stack was covered with aluminum laminates; and three sides containing electrode lead portions were heat-sealed. A mixed electrolyte solution of ethylene carbonate/dimethyl carbonate=40/60 (v/v) containing LiFSI of a concentration of 1.0 mol/L was introduced therein, and the electrolyte solution was made to be fully impregnated in the electrodes. The amount of the electrolyte solution introduced at that time was so regulated that the molar concentration of the lithium salt became 1.5 times the number of moles of the nitroxyl cation substructure and the nitroxyl radical substructure. The remaining fourth side was heat-sealed under reduced pressure to thereby fabricate a laminate-type secondary battery.

Example 2

A secondary battery was fabricated as in Example 1, except for using a mixed electrolyte solution of ethylene carbonate/dimethyl carbonate=40/60 (v/v) containing LiFSI of a concentration of 1.5 mol/L as the electrolyte solution, and so regulating the amount of the electrolyte solution that the molar concentration of the lithium salt became 2.2 times the number of moles of the nitroxyl cation substructure and the nitroxyl radical substructure.

Comparative Example 1

A secondary battery was fabricated as in Example 1, except for using a mixed electrolyte solution of ethylene carbonate/dimethyl carbonate=40/60 (v/v) containing $LiPF_6$ of a concentration of 1 mol/L as the electrolyte solution, and so regulating the amount of the electrolyte solution that the molar concentration of the lithium salt became 1.5 times the number of moles of the nitroxyl cation substructure and the nitroxyl radical substructure.

Comparative Example 2

A secondary battery was fabricated as in Example 1, except for using a mixed electrolyte solution of ethylene carbonate/dimethyl carbonate=40/60 (v/v) containing $LiPF_6$ of a concentration of 1.5 mol/L as the electrolyte solution, and so regulating the amount of the electrolyte solution that the molar concentration of the lithium salt became 2.2 times the number of moles of the nitroxyl cation substructure and the nitroxyl radical substructure.

Comparative Example 3

A secondary battery was fabricated as in Example 1, except for using a mixed electrolyte solution of ethylene carbonate/dimethyl carbonate=40/60 (v/v) containing LiTFSI of a concentration of 1 mol/L as the electrolyte solution, and so regulating the amount of the electrolyte solution that the molar concentration of the lithium salt became 1.5 times the number of moles of the nitroxyl cation substructure and the nitroxyl radical substructure.

(Measurements of Charge and Discharge Rate Characteristics and their Results)

The secondary batteries (organic radical batteries) fabricated in Example 1, Example 2, Comparative Example 1, Comparative Example 2 and Comparative Example 3 were each charged until 4 V and thereafter discharged until 3 V at 1 C in 1 cycle in a thermostatic chamber at 20° C.; and the discharge capacity at that time was taken as 100%. The evaluation of the discharge rate characteristic was made by measuring the discharge capacity by charging and discharging each battery under the same condition as in the above except for making the discharge rate to be 1 C, 20 C and 80 C. The evaluation of the charge rate characteristic was made by measuring the charge capacity by charging and discharging each battery under the same condition as in the above except for making the charge rate to be 1 C, 20 C and 80 C, and making the upper voltage to be 4.5 V.

In Table 1, the evaluation results of the charge and discharge rate characteristics are shown. The discharge capacities of Example 1, Example 2 and Comparative Example 1 exhibited a high discharge rate characteristic of 50 mAh/g or higher even in 80 C. The charge capacities of Example 1 and Example 2, which contained LiFSI, exhibited a higher charge rate characteristic than Comparative Example 1, Comparative Example 2 and Comparative Example 3, which contained no LiFSI, and it was confirmed that by using LiFSI, the secondary batteries having high charge and discharge rate characteristics could be provided.

Further Example 2 exhibited higher rate characteristics than Example 1, and it was confirmed that the case where the lithium salt concentration was 1.5 mol/L and the molar concentration of the lithium salt was 2 or more times the number of moles of the nitroxyl cation substructure and the nitroxyl radical substructure could provide the secondary battery exhibiting higher charge and discharge rate characteristics.

TABLE 1

| | Lithium Salt | Discharge Capacity (mAh/g) | | | Charge Capacity (mAh/g) | | |
|---|---|---|---|---|---|---|---|
| | | 1 C | 20 C | 80 C | 1 C | 20 C | 80 C |
| Example 1 | 1 mol/L LiFSI | 100 | 95 | 63 | 103 | 88 | 52 |
| Example 2 | 1.5 mol/L LiFSI | 102 | 92 | 67 | 105 | 93 | 69 |
| Comparative Example 1 | 1 mol/L LiPF$_6$ | 99 | 90 | 54 | 102 | 82 | 47 |
| Comparative Example 2 | 1.5 mol/L LiPF$_6$ | 97 | 81 | 39 | 101 | 68 | 33 |
| Comparative Example 3 | 1 mol/L LiTFSI | 99 | 92 | 42 | 102 | 83 | 48 |

INDUSTRIAL APPLICABILITY

The present invention can provide a power storage device having high charge and discharge characteristics. Hence, the power storage device obtained in the example embodiment can be applied to driving or auxiliary power storage sources for electric vehicles, hybrid electric vehicles and the like, power sources for various types of portable electronic devices, power storage apparatuses for various types of power generation using energies such as solar energy, wind power and the like, or power storage sources for household electric appliances.

Hitherto, the present invention has been described by reference to the example embodiment (and the Examples), but the present invention is not limited to the example embodiment (and the Examples). Various changes understandable to those skilled in the art may be made on the constitution and details of the present invention within the scope of the present invention.

The present application claims priority from Japanese Patent Application No. 2015-052186, filed on Mar. 16, 2015, the entire disclosure of which is hereby incorporated.

REFERENCE SIGNS LIST

101 Cathode
102 Anode
103 Current Collector
104 Electrode Lead
105 Separator
106 Exterior Packaging Film
107 Laminate-Type Secondary Battery

The invention claimed is:

1. A power storage device, comprising:
a cathode comprising a nitroxyl compound taking a nitroxyl cation substructure represented by the following formula (1) in an oxidized state and a nitroxyl radical substructure represented by the following formula (2) in a reduced state;
an anode comprising an active material capable of reversibly intercalating and deintercalating a lithium ion; and
an electrolyte solution comprising a lithium salt and an aprotic organic solvent, wherein the lithium salt comprises Li[(FSO$_2$)$_2$N]:

Reaction Scheme (A)

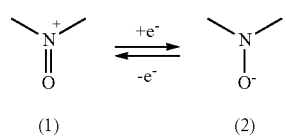

(1)  (2)

2. The power storage device according to claim 1, wherein a concentration of the lithium salt comprised in the electrolyte solution is 1.0 mol/L to 8.0 mol/L.

3. The power storage device according to claim 1, wherein the electrolyte solution comprises a film forming additive.

4. The power storage device according to claim 1, wherein the film forming additive is vinylene carbonate or propanesultone.

5. The power storage device according to claim 1, wherein a number of moles of the lithium salt comprised in the electrolyte solution is 1.5 or more times a number of moles of the nitroxyl cation substructure and the nitroxyl radical substructure.

6. The power storage device according to any one of claim 2, wherein the active material comprised in the anode and capable of reversibly intercalating and deintercalating a lithium ion is a carbon material.

7. The power storage device according to claim 6, wherein the nitroxyl compound comprised in the cathode is a nitroxyl radical polymeric compound having a 2,2,6,6-tetramethylpiperidinyloxy radical or a 2,2,5,5-tetramethylpyrrolidinyloxy radical.

8. The power storage device according to claim 7, wherein the nitroxyl polymer compound comprised in the cathode is selected from the group of nitroxyl polymer compounds having a unit structure represented by one of the following formulas (3) to (7):

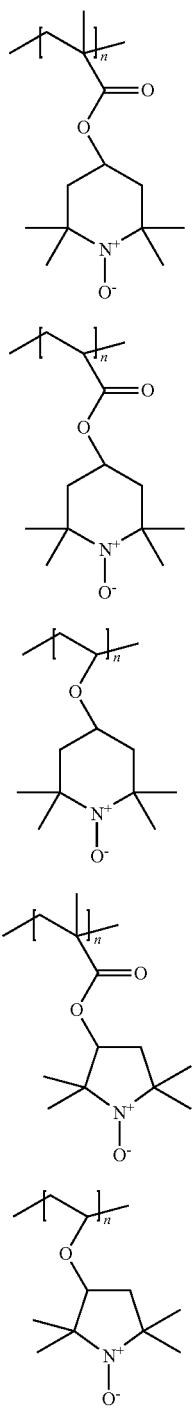

wherein n represents an integer of 1 or more.

9. The power storage device according to claim 6, wherein the nitroxyl compound comprised in the cathode is a poly [(2,2,6,6-tetramethylpiperidinyloxy-4-yl) methacrylate].

10. The power storage device according to claim 7, wherein a weight-average molecular weight of the nitroxyl compound comprised in the cathode is at least selected from the range of 20,000 or higher and 500,000 or lower.

11. The power storage device according to claim 1, wherein the aprotic organic solvent comprises at least one of ethylene carbonate and dimethyl carbonate.

12. The power storage device according to claim 3, wherein the active material comprised in the anode and capable of reversibly intercalating and deintercalating a lithium ion is a carbon material.

13. The power storage device according to claim 12, wherein the nitroxyl compound comprised in the cathode is a nitroxyl radical polymeric compound having a 2,2,6,6-tetramethylpiperidinyloxy radical or a 2,2,5,5-tetramethylpyrrolidinyloxy radical.

14. The power storage device according to claim 4, wherein the active material comprised in the anode and capable of reversibly intercalating and deintercalating a lithium ion is a carbon material.

15. The power storage device according to claim 14, wherein the nitroxyl compound comprised in the cathode is a nitroxyl radical polymeric compound having a 2,2,6,6-tetramethylpiperidinyloxy radical or a 2,2,5,5-tetramethylpyrrolidinyloxy radical.

16. The power storage device according to claim 5, wherein the active material comprised in the anode and capable of reversibly intercalating and deintercalating a lithium ion is a carbon material.

17. The power storage device according to claim 16, wherein the nitroxyl compound comprised in the cathode is a nitroxyl radical polymeric compound having a 2,2,6,6-tetramethylpiperidinyloxy radical or a 2,2,5,5-tetramethylpyrrolidinyloxy radical.

18. The power storage device according to claim 2, wherein the aprotic organic solvent comprises at least one of ethylene carbonate and dimethyl carbonate.

19. The power storage device according to claim 3, wherein the aprotic organic solvent comprises at least one of ethylene carbonate and dimethyl carbonate.

20. The power storage device according to claim 5, wherein the aprotic organic solvent comprises at least one of ethylene carbonate and dimethyl carbonate.

21. The power storage device according to claim 1, wherein the concentration of the lithium salt comprised in the electrolyte solution is 1.5 mol/L to 6 mol/L.

22. The power storage device according to claim 5, wherein the number of moles in the lithium salt comprised in the electrolyte solution is 2.0 or more times a number of moles of the nitroxyl cation substructure and the nitroxyl radical substructure.

* * * * *